US008585487B2

(12) United States Patent
Rodgers et al.

(10) Patent No.: US 8,585,487 B2
(45) Date of Patent: Nov. 19, 2013

(54) GAMING SYSTEM, GAMING DEVICE AND GAMING METHOD PROVIDING STACKING SYMBOLS AND CONVERTIBLE REELS

(75) Inventors: Paulina Rodgers, Reno, NV (US); Karen Michelle Cregan, Reno, NV (US); Benjamin C. Hoffman, Reno, NV (US)

(73) Assignee: IGT, Las Vegas, NV (US)

( * ) Notice: Subject to any disclaimer, the term of this patent is extended or adjusted under 35 U.S.C. 154(b) by 1775 days.

(21) Appl. No.: 11/937,776

(22) Filed: Nov. 9, 2007

(65) Prior Publication Data

US 2009/0124347 A1 May 14, 2009

(51) Int. Cl.
*A63F 13/00* (2006.01)

(52) U.S. Cl.
USPC .................... 463/21; 463/16; 463/20; 463/42

(58) Field of Classification Search
USPC ......................................... 463/16, 20, 25, 42
See application file for complete search history.

(56) References Cited

U.S. PATENT DOCUMENTS 1,564,746 A 12/1925 Barnard
3,977,681 A 8/1976 Deitrich
4,099,722 A 7/1978 Rodesch et al.
4,114,890 A 9/1978 Yamamoto et al.
4,171,814 A 10/1979 Tamano
4,200,291 A 4/1980 Hooker
4,448,419 A 5/1984 Telnaes
4,573,681 A 3/1986 Okada
4,636,951 A 1/1987 Harlick
4,651,996 A 3/1987 Watkins, Jr.
4,838,552 A 6/1989 Hagiwara
RE34,244 E 5/1993 Hagiwara
5,308,065 A 5/1994 Bridgeman et al.

(Continued)

FOREIGN PATENT DOCUMENTS

EP 058488 8/1982
EP 0373801 A2 * 12/1988 ........................ 17/34

(Continued)

OTHER PUBLICATIONS

Wolf Run Video Slots Advertisement, written by IGT, published in 2006.

(Continued)

*Primary Examiner* — Damon Pierce
*Assistant Examiner* — Shahid Kamal
(74) *Attorney, Agent, or Firm* — Neal, Gerber & Eisenberg LLP

(57) ABSTRACT

The gaming system, gaming device and method provides a reel game that includes stacks of symbols configured on the reels to provide a large number of winning symbol combinations. The gaming device includes a plurality of reels wherein each reel includes a reel-strip and a plurality of symbols. Each of the plurality of reels is configured to include one or more stacks of symbols wherein a stack of symbols is formed by placing a plurality of identical symbols adjacent to each other on a single reel. If two non-adjacent reels each generated a stack of identical symbols and at least one reel positioned between the two non-adjacent reels generated symbols different from the symbols used to form the stack of identical symbols, at least one symbol on the at least one reel positioned between the two non-adjacent reels is modified into the symbol that forms the stacks of identical symbols.

6 Claims, 11 Drawing Sheets

(56) References Cited

U.S. PATENT DOCUMENTS

| | | | | |
|---|---|---|---|---|
| 5,332,228 | A | 7/1994 | Schultz | |
| 5,393,061 | A | 2/1995 | Manship et al. | |
| 5,395,111 | A | 3/1995 | Inoue | |
| 5,423,539 | A | 6/1995 | Nagao | |
| 5,431,408 | A | 7/1995 | Adams | |
| 5,449,173 | A | 9/1995 | Thomas et al. | |
| 5,564,700 | A | 10/1996 | Celona | |
| 5,580,053 | A | 12/1996 | Crouch | |
| 5,584,764 | A | 12/1996 | Inoue | |
| 5,609,524 | A | 3/1997 | Inoue | |
| 5,611,535 | A | 3/1997 | Tiberio | |
| 5,704,835 | A | 1/1998 | Dietz, II | |
| 5,720,662 | A | 2/1998 | Holmes, Jr. et al. | |
| 5,722,891 | A | 3/1998 | Inoue | |
| 5,752,881 | A | 5/1998 | Inoue | |
| 5,766,074 | A | 6/1998 | Cannon et al. | |
| 5,769,716 | A | 6/1998 | Saffari et al. | |
| 5,807,172 | A | 9/1998 | Piechowiak | |
| 5,823,873 | A | 10/1998 | Moody | |
| 5,833,238 | A | 11/1998 | Watanabe | |
| 5,833,536 | A | 11/1998 | Davids et al. | |
| 5,833,537 | A | 11/1998 | Barrie | |
| 5,863,249 | A | 1/1999 | Inoue | |
| 5,927,714 | A | 7/1999 | Kaplan | |
| 5,934,672 | A * | 8/1999 | Sines et al. | 273/143 R |
| 5,935,002 | A | 8/1999 | Falciglia | |
| 5,951,397 | A | 9/1999 | Dickinson | |
| 5,980,384 | A | 11/1999 | Barrie | |
| 5,984,782 | A | 11/1999 | Inoue | |
| 6,027,115 | A | 2/2000 | Griswold et al. | |
| 6,056,642 | A | 5/2000 | Bennett | |
| 6,059,658 | A | 5/2000 | Mangano et al. | |
| 6,086,066 | A | 7/2000 | Takeuchi et al. | |
| 6,089,977 | A | 7/2000 | Bennett | |
| 6,093,102 | A | 7/2000 | Bennett | |
| 6,117,013 | A | 9/2000 | Eiba | |
| 6,120,031 | A | 9/2000 | Adams | |
| 6,149,521 | A | 11/2000 | Sanduski | |
| 6,159,095 | A | 12/2000 | Frohm et al. | |
| 6,174,235 | B1 | 1/2001 | Walker et al. | |
| 6,190,254 | B1 | 2/2001 | Bennett | |
| 6,220,959 | B1 | 4/2001 | Holmes, Jr. et al. | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,311,976 | B1 | 11/2001 | Yoseloff et al. | |
| 6,319,124 | B1 | 11/2001 | Baerlocher et al. | |
| 6,322,078 | B1 | 11/2001 | Adams | |
| 6,358,144 | B1 | 3/2002 | Kaddlic et al. | |
| 6,364,766 | B1 | 4/2002 | Anderson et al. | |
| 6,398,644 | B1 | 6/2002 | Perrie et al. | |
| 6,409,602 | B1 | 6/2002 | Wilshire et al. | |
| 6,413,162 | B1 | 7/2002 | Baerlocher et al. | |
| 6,416,408 | B2 | 7/2002 | Tracy et al. | |
| 6,419,579 | B1 | 7/2002 | Bennett | |
| 6,428,412 | B1 | 8/2002 | Anderson et al. | |
| 6,439,993 | B1 | 8/2002 | O'Halloran | |
| 6,439,995 | B1 | 8/2002 | Hughs-Baird et al. | |
| 6,454,266 | B1 | 9/2002 | Breeding et al. | |
| 6,494,454 | B2 | 12/2002 | Adams | |
| 6,506,114 | B1 | 1/2003 | Estes et al. | |
| 6,514,141 | B1 | 2/2003 | Kaminkow et al. | |
| 6,517,432 | B1 | 2/2003 | Jaffe | |
| 6,517,433 | B2 | 2/2003 | Loose et al. | |
| 6,551,187 | B1 | 4/2003 | Jaffe | |
| 6,561,904 | B2 | 5/2003 | Locke et al. | |
| 6,565,433 | B1 | 5/2003 | Baerlocher | |
| 6,585,591 | B1 | 7/2003 | Baerlocher et al. | |
| 6,604,740 | B1 | 8/2003 | Singer et al. | |
| 6,616,142 | B2 | 9/2003 | Adams | |
| 6,634,945 | B2 | 10/2003 | Glavich et al. | |
| 6,644,663 | B2 | 11/2003 | Seelig et al. | |
| 6,676,511 | B2 | 1/2004 | Payne et al. | |
| 6,719,630 | B1 | 4/2004 | Seelig et al. | |
| 6,726,204 | B2 | 4/2004 | Inoue | |
| 6,731,313 | B1 | 5/2004 | Kaminkow | |
| 6,835,133 | B2 | 12/2004 | Baerlocher et al. | |
| 6,855,054 | B2 | 2/2005 | White et al. | |
| 6,880,826 | B2 | 4/2005 | Inoue | |
| 6,905,406 | B2 | 6/2005 | Kaminkow et al. | |
| 6,921,335 | B2 | 7/2005 | Rodgers et al. | |
| 6,923,441 | B2 | 8/2005 | Inoue | |
| 6,932,700 | B2 | 8/2005 | Bennett et al. | |
| 6,942,572 | B2 | 9/2005 | Inoue | |
| 6,960,133 | B1 | 11/2005 | Marks et al. | |
| 6,976,915 | B2 | 12/2005 | Baker et al. | |
| 6,981,635 | B1 | 1/2006 | Hughs-Baird et al. | |
| 6,997,808 | B2 | 2/2006 | Rodgers et al. | |
| 7,001,274 | B2 | 2/2006 | Baerlocher et al. | |
| 7,014,560 | B2 | 3/2006 | Glavich et al. | |
| 7,018,293 | B2 | 3/2006 | Brown et al. | |
| 7,048,275 | B2 | 5/2006 | Adams | |
| 7,056,213 | B2 | 6/2006 | Ching et al. | |
| 7,070,502 | B1 | 7/2006 | Bussick et al. | |
| 7,074,127 | B2 | 7/2006 | Cuddy et al. | |
| 7,077,744 | B2 | 7/2006 | Cannon | |
| 7,077,745 | B2 | 7/2006 | Gomez et al. | |
| 7,090,580 | B2 | 8/2006 | Rodgers et al. | |
| 7,094,148 | B2 | 8/2006 | Baerlocher et al. | |
| 7,137,888 | B2 | 11/2006 | Glavich et al. | |
| 7,144,322 | B2 | 12/2006 | Gomez et al. | |
| 7,160,187 | B2 | 1/2007 | Loose et al. | |
| 7,168,704 | B1 | 1/2007 | Lawless | |
| 7,204,753 | B2 | 4/2007 | Ozaki et al. | |
| 7,252,591 | B2 | 8/2007 | Van Asdale | |
| 7,252,592 | B2 | 8/2007 | Rodgers et al. | |
| 7,275,988 | B2 | 10/2007 | Aida et al. | |
| 7,311,607 | B2 * | 12/2007 | Tedsen et al. | 463/32 |
| 7,396,279 | B2 | 7/2008 | Berman et al. | |
| 7,399,225 | B2 | 7/2008 | Kaminkow | |
| 7,442,123 | B2 | 10/2008 | Brill et al. | |
| 7,699,698 | B2 * | 4/2010 | Randall | 463/20 |
| 2002/0068623 | A1 | 6/2002 | Gauselmann | |
| 2002/0077165 | A1 | 6/2002 | Bansemer et al. | |
| 2002/0160836 | A1 | 10/2002 | Watanabe et al. | |
| 2003/0036422 | A1 * | 2/2003 | Baerlocher et al. | 463/20 |
| 2003/0054874 | A1 | 3/2003 | Kaminkow | |
| 2003/0057645 | A1 | 3/2003 | Baerlocher et al. | |
| 2003/0060267 | A1 | 3/2003 | Glavich et al. | |
| 2003/0100356 | A1 | 5/2003 | Brown et al. | |
| 2003/0125100 | A1 | 7/2003 | Cannon | |
| 2003/0203752 | A1 | 10/2003 | Kaminkow et al. | |
| 2003/0203753 | A1 | 10/2003 | Muir et al. | |
| 2004/0033829 | A1 | 2/2004 | Pacey et al. | |
| 2004/0048650 | A1 | 3/2004 | Mierau et al. | |
| 2004/0053676 | A1 | 3/2004 | Rodgers et al. | |
| 2004/0242313 | A1 | 12/2004 | Munoz | |
| 2005/0049035 | A1 | 3/2005 | Baerlocher et al. | |
| 2005/0054405 | A1 | 3/2005 | Baerlocher et al. | |
| 2005/0054418 | A1 | 3/2005 | Baerlocher et al. | |
| 2005/0059477 | A1 | 3/2005 | Baerlocher | |
| 2005/0059478 | A1 | 3/2005 | Peterson et al. | |
| 2005/0064924 | A1 | 3/2005 | Glavich et al. | |
| 2005/0148384 | A1 | 7/2005 | Marks et al. | |
| 2005/0192081 | A1 | 9/2005 | Marks et al. | |
| 2005/0227754 | A1 | 10/2005 | Kaminkow et al. | |
| 2005/0282620 | A1 | 12/2005 | Marks et al. | |
| 2005/0288094 | A1 | 12/2005 | Marks et al. | |
| 2006/0019738 | A1 | 1/2006 | Baerlocher et al. | |
| 2006/0030392 | A1 | 2/2006 | Rodgers et al. | |
| 2006/0040728 | A1 | 2/2006 | Fuller | |
| 2006/0046830 | A1 | 3/2006 | Webb | |
| 2006/0068875 | A1 | 3/2006 | Cregan et al. | |
| 2006/0068884 | A1 | 3/2006 | Baerlocher et al. | |
| 2006/0068885 | A1 | 3/2006 | Cregan et al. | |
| 2006/0073872 | A1 | 4/2006 | B-Jensen et al. | |
| 2006/0073879 | A1 | 4/2006 | Baerlocher | |
| 2006/0084492 | A1 | 4/2006 | Baerlocher et al. | |
| 2006/0084494 | A1 | 4/2006 | Belger et al. | |
| 2006/0084498 | A1 | 4/2006 | Baerlocher et al. | |

(56) References Cited

U.S. PATENT DOCUMENTS

| | | | | |
|---|---|---|---|---|
| 2006/0089191 | A1 | 4/2006 | Singer et al. | |
| 2006/0111174 | A1 | 5/2006 | Baerlocher et al. | |
| 2006/0116195 | A1 | 6/2006 | Baerlocher et al. | |
| 2006/0135247 | A1 | 6/2006 | Baerlocher et al. | |
| 2006/0172795 | A1 | 8/2006 | Bussick et al. | |
| 2006/0199636 | A1 | 9/2006 | Ching et al. | |
| 2006/0199637 | A1 | 9/2006 | Ching et al. | |
| 2007/0004489 | A1 | 1/2007 | Rodgers et al. | |
| 2007/0010316 | A1 | 1/2007 | Baerlocher et al. | |
| 2007/0021175 | A1 | 1/2007 | Rodgers et al. | |
| 2007/0021188 | A1 | 1/2007 | Rodgers et al. | |
| 2007/0060246 | A1 | 3/2007 | Baerlocher et al. | |
| 2007/0060248 | A1 | 3/2007 | Rodgers et al. | |
| 2007/0060294 | A1 | 3/2007 | Cuddy et al. | |
| 2007/0087812 | A1 | 4/2007 | Glavich et al. | |
| 2008/0045309 | A1* | 2/2008 | Okada | 463/20 |
| 2008/0108409 | A1* | 5/2008 | Cole et al. | 463/20 |
| 2008/0113735 | A1* | 5/2008 | Maya | 463/20 |
| 2008/0139298 | A1 | 6/2008 | Rodgers et al. | |
| 2008/0182644 | A1* | 7/2008 | Lutnick et al. | 463/20 |
| 2008/0200232 | A1 | 8/2008 | Baerlocher et al. | |
| 2009/0118004 | A1 | 5/2009 | Hoffman | |
| 2009/0124342 | A1* | 5/2009 | Fong | 463/20 |
| 2009/0227337 | A1* | 9/2009 | Langille et al. | 463/20 |
| 2011/0130193 | A1* | 6/2011 | Belger et al. | 463/20 |

FOREIGN PATENT DOCUMENTS

| | | |
|---|---|---|
| EP | 1 063 622 | 12/2000 |
| GB | 1 454 046 | 10/1976 |
| GB | 2 062 922 | 5/1981 |
| GB | 2 106 293 | 9/1981 |
| GB | 2 097 160 | 10/1982 |
| GB | 2 106 295 | 4/1983 |
| GB | 2 165 385 | 4/1986 |
| GB | 2 243 236 | 4/1990 |
| GB | 2 372 132 | 2/2001 |
| GB | 2 372 617 | 8/2002 |
| WO | WO 98/20949 | 5/1998 |
| WO | WO 00/30727 | 6/2000 |
| WO | WO 2007/053349 | 5/2007 |

OTHER PUBLICATIONS

50 Lions, written by videoslotmachines.com, published prior to 2007.

* cited by examiner

BECAUSE THE FIRST AND FOURTH REELS DISPLAYED STACKS OF CHERRY SYMBOLS AND THE HIGHLIGHTED SYMBOLS ARE DISPLAYED IN THE SAME ROWS AS THE STACKED CHERRY SYMBOLS, THE HIGHLIGHTED SYMBOLS WILL BE MODIFIED INTO CHERRY SYMBOLS.

GAMING SYSTEM, GAMING DEVICE AND GAMING METHOD PROVIDING STACKING SYMBOLS AND CONVERTIBLE REELS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. Known slot gaming device includes a plurality of reels and one or more paylines. Such known gaming devices typically include a suitable number of reels, such as three to five reels, which each display a suitable number of symbols per reel, such as three symbols per reel, wherein each reel includes one symbol displayed in each of a plurality of symbol positions on that reel. Such gaming devices may have one, three, five, nine, fifteen, twenty-five or any other suitable number of paylines which are horizontal, vertical, diagonal or any combination thereof.

In certain known slot gaming machines, upon placing one or more wagers, the reels spin to generate a plurality of symbols and the gaming device analyzes the generated symbols to determine if the gaming device has randomly generated a winning symbol or winning symbol combination on or along one or more of the wagered on paylines. Any awards associated with any generated winning symbols or winning symbol combinations generated along any wagered on paylines are provided to the player. Alternatively, any awards associated with any winning symbols or winning symbol combinations that are generated anywhere on a wagered on payline (i.e., a line scatter pay) or anywhere on the reels (i.e., a reel scatter pay) are provided to the player.

In these known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. In one known slot gaming machine, the player wagers on a number or combination of paylines, such as one, two, three, five, ten or fifteen paylines. Thus, it is known that a gaming machine, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Symbol stacking in a reel game is also known. Symbol stacking is implemented by forming stacks of one or more identical symbols adjacent to each other on a reel strip of a single reel. The identical symbols on the same single reel are adjacent to each other, and thus "stacked." For example, four cherry symbols will appear adjacent to each other on a reel to form a stack of four cherry symbols. Stacks of symbols are similarly formed on each of the reels in the reel gaming machine. In one known slot gaming device, when a gaming machine generates stacks of symbols that are identical on three or more adjacent reels, multiple winning symbol combinations can be formed and the gaming machine can provide large payouts to the player.

Using such stacked symbols in a reel gaming machine creates a problem when stacks of symbols are not generated on adjacent reels. A gaming machine may generate stacks of identical symbols on two non-adjacent reels. If the generated stacks of identical symbols on the two reels are separated by one or more reels that generated symbols different than the stacks of symbols, a winning combination of symbols cannot be formed from what appeared to be an impressive generation of symbols. Often times players receive many stacks of symbols but no winning symbol combinations, so what should be a positive outcome becomes a negative outcome for the player. Therefore, there is a need to solve this perceived negative outcome.

SUMMARY

The gaming system, gaming device and method disclosed herein includes in various embodiments a plurality of reels including a plurality of symbols. In one embodiment, each reel has a plurality of the symbols, a plurality of the reels each include at least one stack of symbols, wherein a stack of symbols includes a plurality of identical symbols positioned adjacent to each other on the reel. For example, a stack of cherry symbols is formed from at least two identical cherry symbols positioned adjacent to each other on the same reel strip. In the gaming system and method disclosed herein, if a first reel and a non-adjacent second reel each generate a stack of identical symbols, and at least one designated reel that does not generate a stack of the identical symbols is positioned between the first and second reels, the gaming device is operable to convert or modify one or more of the plurality of symbols displayed on the designated reel into one or more symbols that are identical to the symbols which form the stacks of symbols on the first and second reel. Such a configuration provides an opportunity to form a large number of winning symbol combinations, even though adjacent reels do not initially generate stacks of identical symbols.

In another embodiment, the gaming device includes a plurality of symbols on each of a plurality of reels arranged to form a stack of symbols. For example, one reel includes three cherry symbols at three adjacent symbol positions and the remaining symbols are non-stacked symbols, and another reel includes three cherry symbols at three adjacent symbol positions and the remaining symbols are non-stacked symbols. Therefore, at least two reels of the gaming device are capable of generating a stack of symbols in addition to a plurality of non-stacked symbols.

In operation of one embodiment, the gaming device randomly generates and displays a plurality of symbols on the plurality of reels. For example, a first reel generates and displays a stack of three cherry symbols; a second reel generates and displays a bell symbol, orange symbol, and seven symbol; and a third reel generates and displays a stack of three cherry symbols. The gaming device analyzes the plurality of symbols displayed on the plurality of reels to determine if at least two non-adjacent reels each generated a stack of symbols, wherein a stack of symbols is formed from a plurality of identical designated symbols generated and displayed adjacent to each other. Utilizing the example discussed above, the gaming device determines that the first reel and the third reel are non-adjacent reels that both generated a stack of cherry symbols.

In one embodiment, if at least two non-adjacent reels each generated and displayed a stack of designated symbols, the gaming device determines if at least one reel positioned between these non-adjacent reels (i.e., a convertible reel) generated and displayed a plurality of symbols different than the stacks of designated symbols displayed on the non-adjacent reels (i.e., flanking reels that flank the convertible reel). In the above-described example, the gaming device determines that the second reel (i.e., the convertible reel) generated and displayed symbols other than stacks of cherry symbols.

In this embodiment, if the at least one convertible reel generated and displayed symbols that are different from the stacks of designated symbols generated and displayed on the non-adjacent reels that each generated a stack of symbols, the gaming device is operable to convert or modify at least one of the plurality of generated symbols that is different from the designated symbol on the convertible reel into the designated symbol. Continuing with the above example, the gaming device modifies each of the plurality of symbols displayed on the second reel into a cherry symbol. After the symbols on the convertible reel are modified, the gaming device determines any awards based on the generated symbols on the non-adjacent reels and the modified symbols on the convertible reel. For example, after the modification, the gaming device determines an award associated with a plurality of winning symbol combinations based on the stack of three cherry symbols on the first reel, the modified stack of three cherry symbols on the second reel, and the stack of three cherry symbols on the third reel. The gaming device therefore provides an opportunity to form a large number of winning symbol combinations, even though adjacent reels did not initially generate stacks of identical symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION

The present disclosure may be implemented in various configurations for gaming machines, gaming devices or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
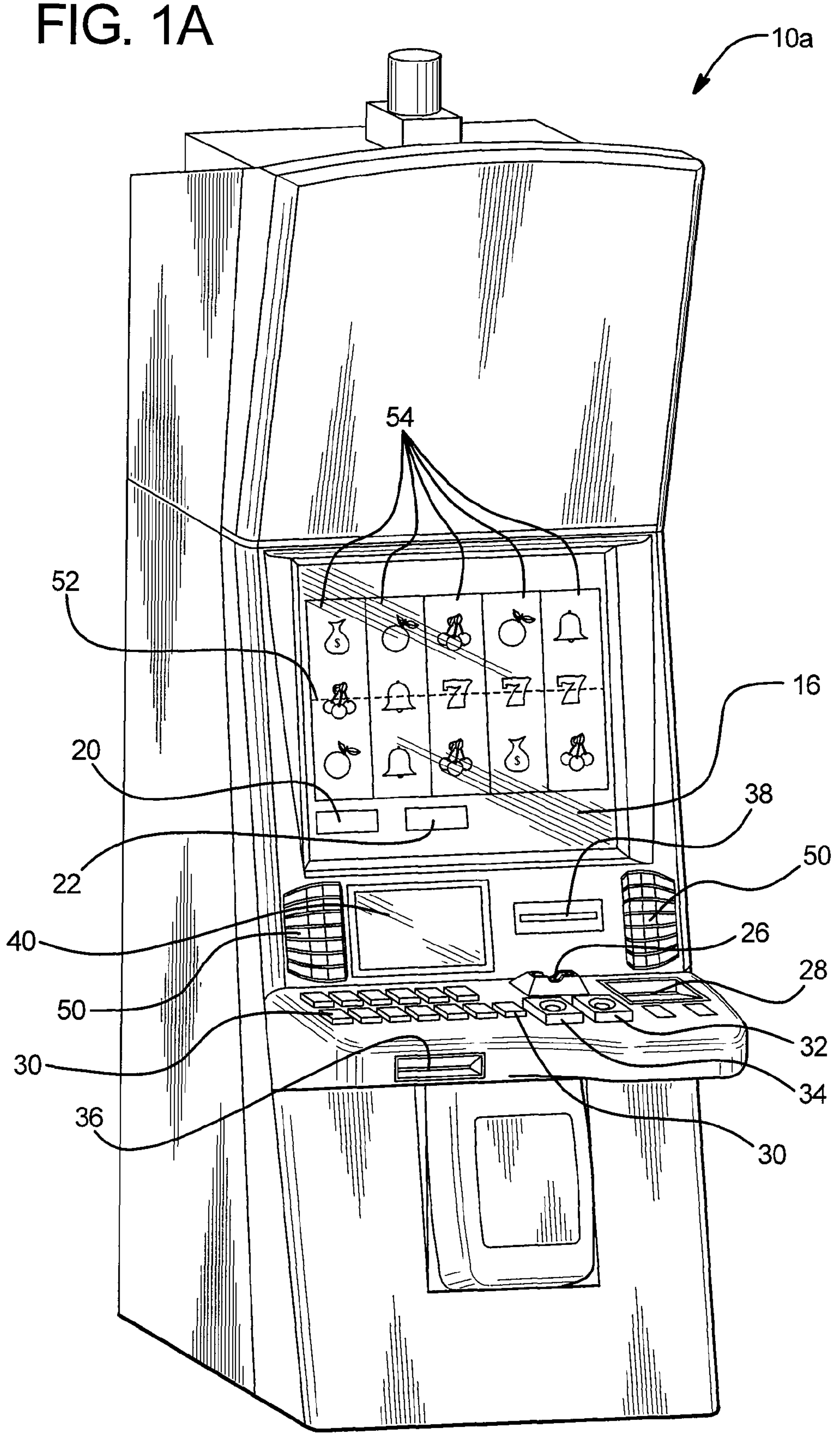
FIG. 1A is a front-side perspective view of one embodiment of the gaming device disclosed herein.
Figure 1B:
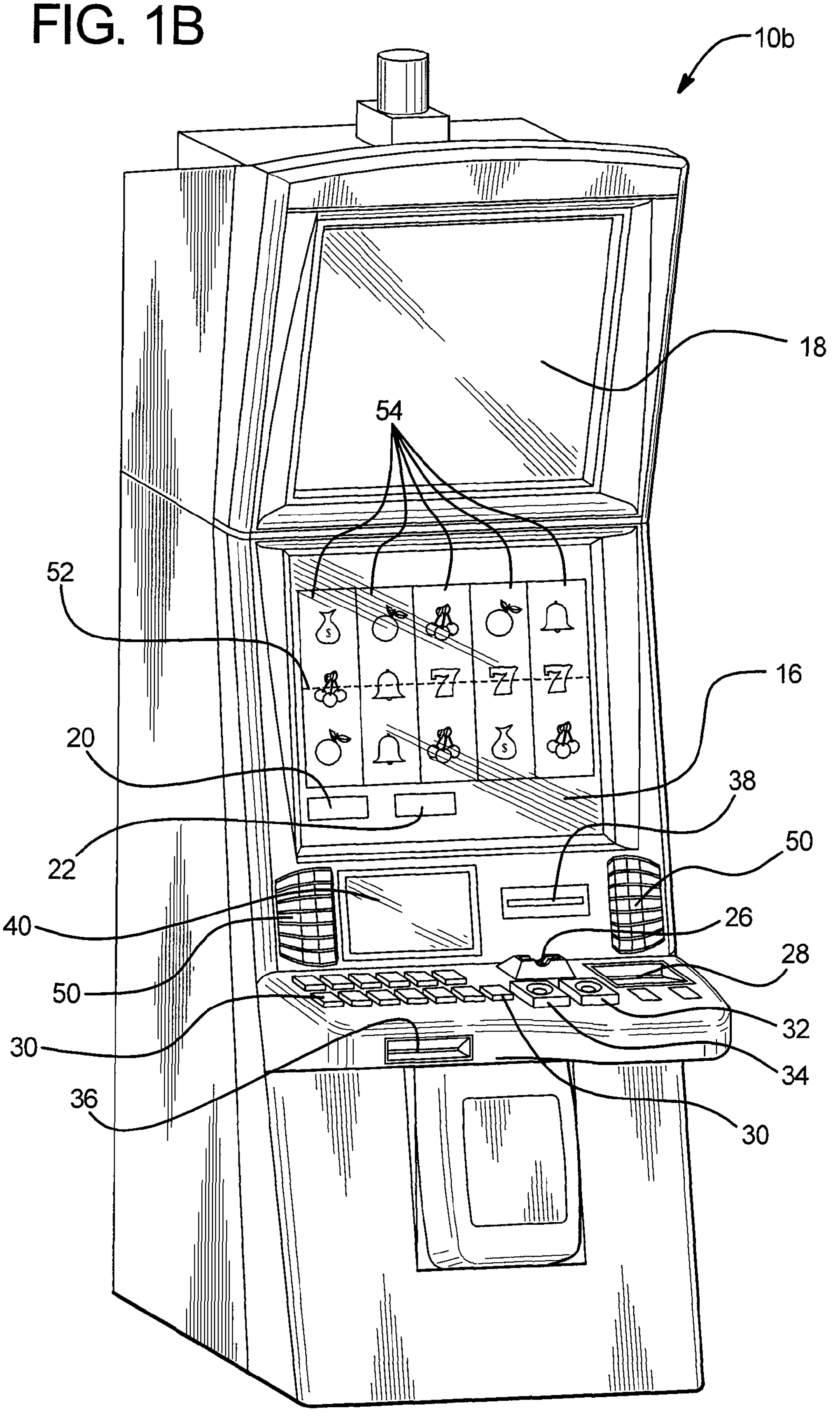
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
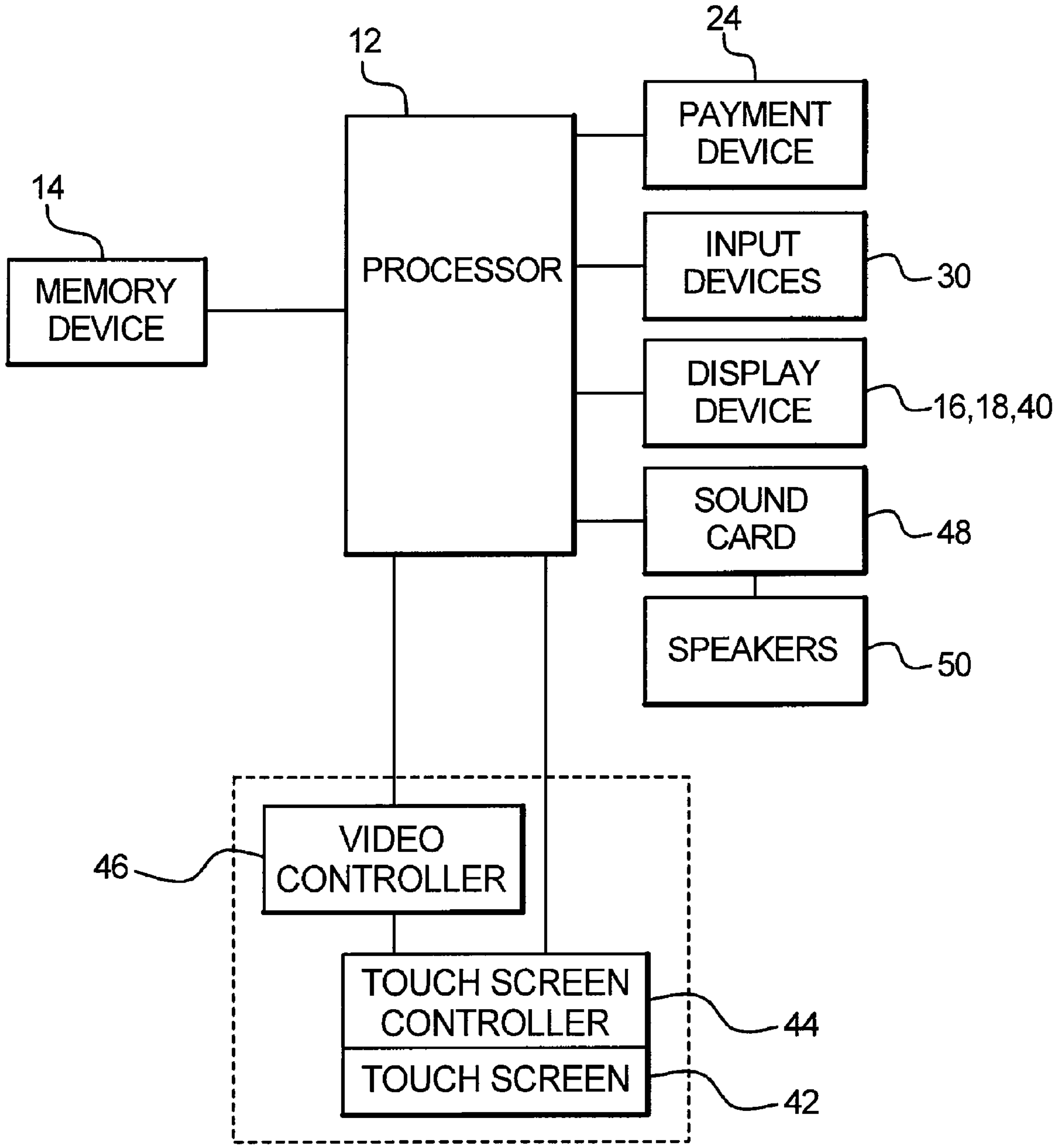
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels or reels, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, wherein the game including stacks of symbols and convertible reels is incorporated as a secondary or bonus game, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, wherein the game including stacks of symbols and convertible reels is incorporated as a secondary or bonus game, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, wherein the game including stacks of symbols and convertible reels is incorporated as a secondary or bonus game, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, if the game including stacks of symbols and convertible reels is provided as a base game, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
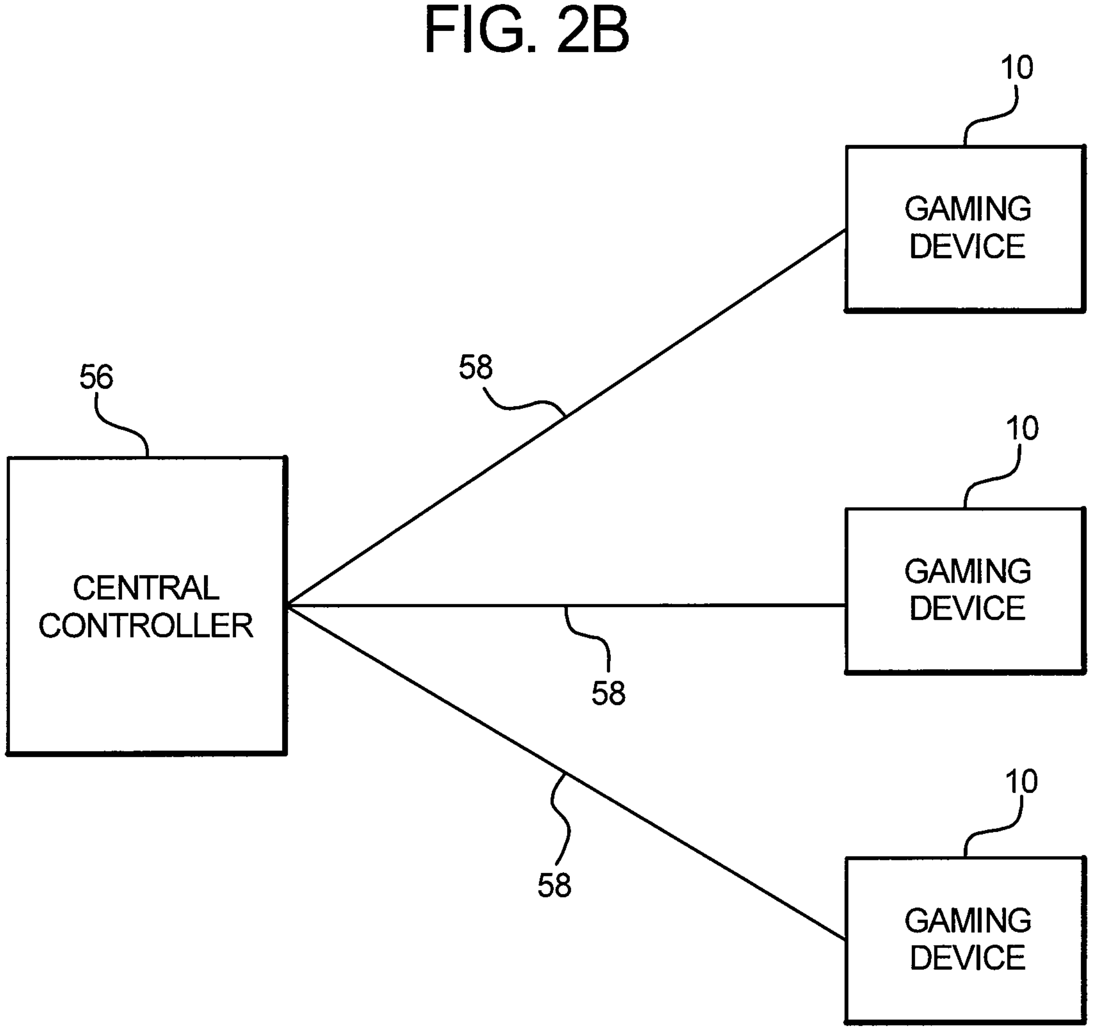
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first win outcome of $10 which will be provided to a first player regardless of how the first player plays in a first game and a second gaming device to have selected elements marked in a different predetermined pattern is provided a second win outcome of $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards.

In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Symbol Stacks and Convertible Reels

Figure 3:
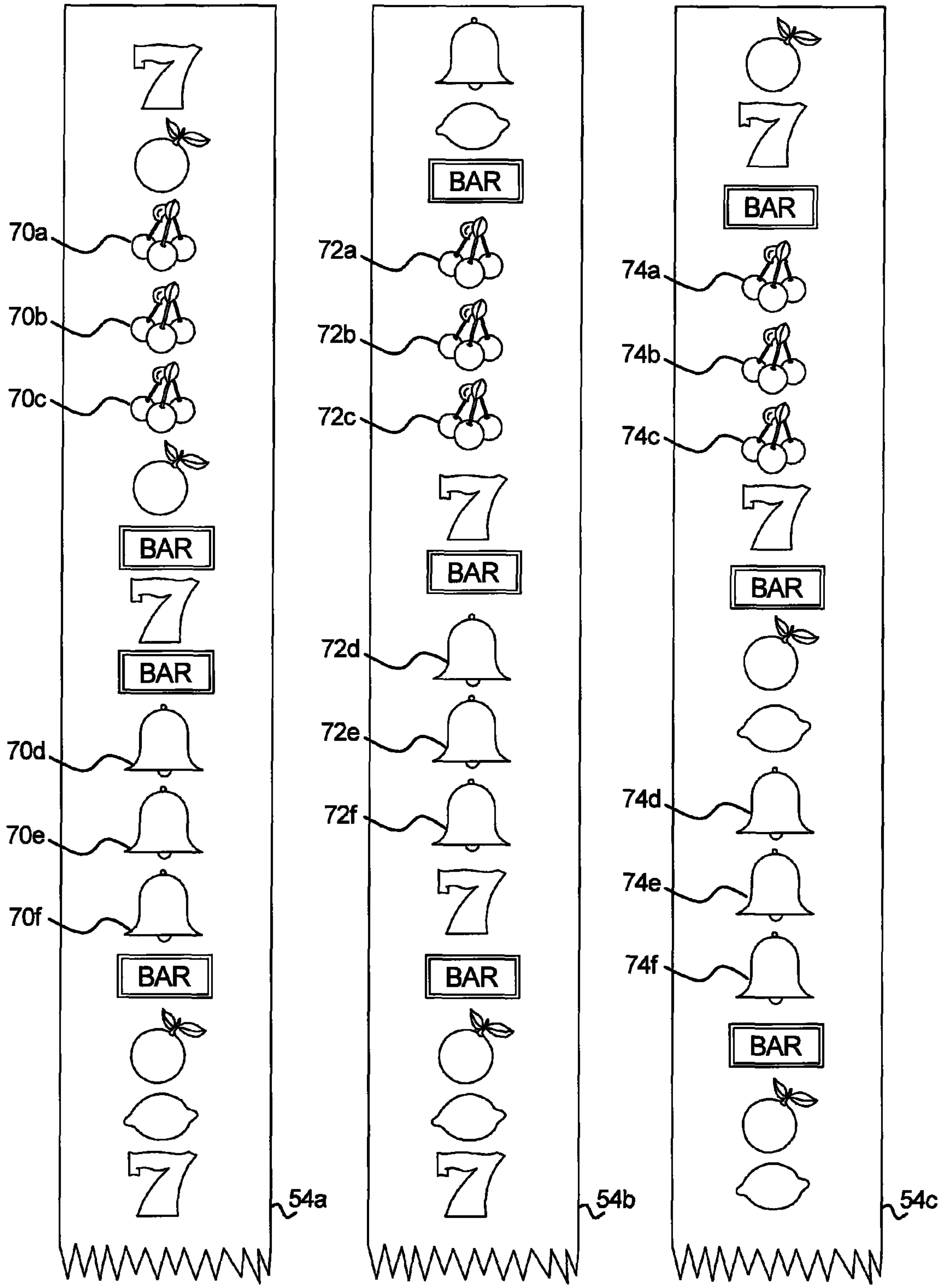
FIG. 3 is a fragmented elevation view of one embodiment of three reels of the gaming device illustrating a plurality of stacks of symbols on each reel.

Turning now to FIG. 3, one embodiment of the reel configurations of the present disclosure is illustrated. The gaming device includes a plurality of reels, wherein each reel includes a plurality of symbol positions (i.e., 22 positions or any suitable number of positions) on a reel strip and a plurality of symbols. In one embodiment, at least two reels each include at least one stack of symbols, wherein a stack of symbols is formed by arranging a plurality of identical symbols adjacent to each other on the same reel.

In one embodiment, as seen in FIG. 3, reel 54*a* includes three cherry symbols 70*a*, 70*b*, and 70*c* at three adjacent symbol positions to form a stack of three cherry symbols, and three bell symbols 70*d*, 70*e*, and 70*f* at three adjacent symbol positions to form a stack of three bell symbols, wherein the remaining symbols are non-stacked symbols. Reel 54*b* includes three cherry symbols 72*a*, 72*b*, and 72*c* at three adjacent symbol positions to form a stack of three cherry symbols, and three bell symbols 72*d*, 72*e*, and 72*f* at three adjacent symbol positions to form a stack of three bell symbols, wherein the remaining symbols are non-stacked symbols. Reel 54*c* includes three cherry symbols 74*a*, 74*b*, and 74*c* at three adjacent symbol positions to form a stack of three cherry symbols, and three bell symbols 74*d*, 74*e*, and 74*f* at three adjacent symbol positions to form a stack of three bell symbols, wherein the remaining symbols are non-stacked symbols. Thus, this configuration provides a plurality of different stacks of symbols on at least two reels. In one embodiment, the gaming device includes any number of reels.

Figure 4A:
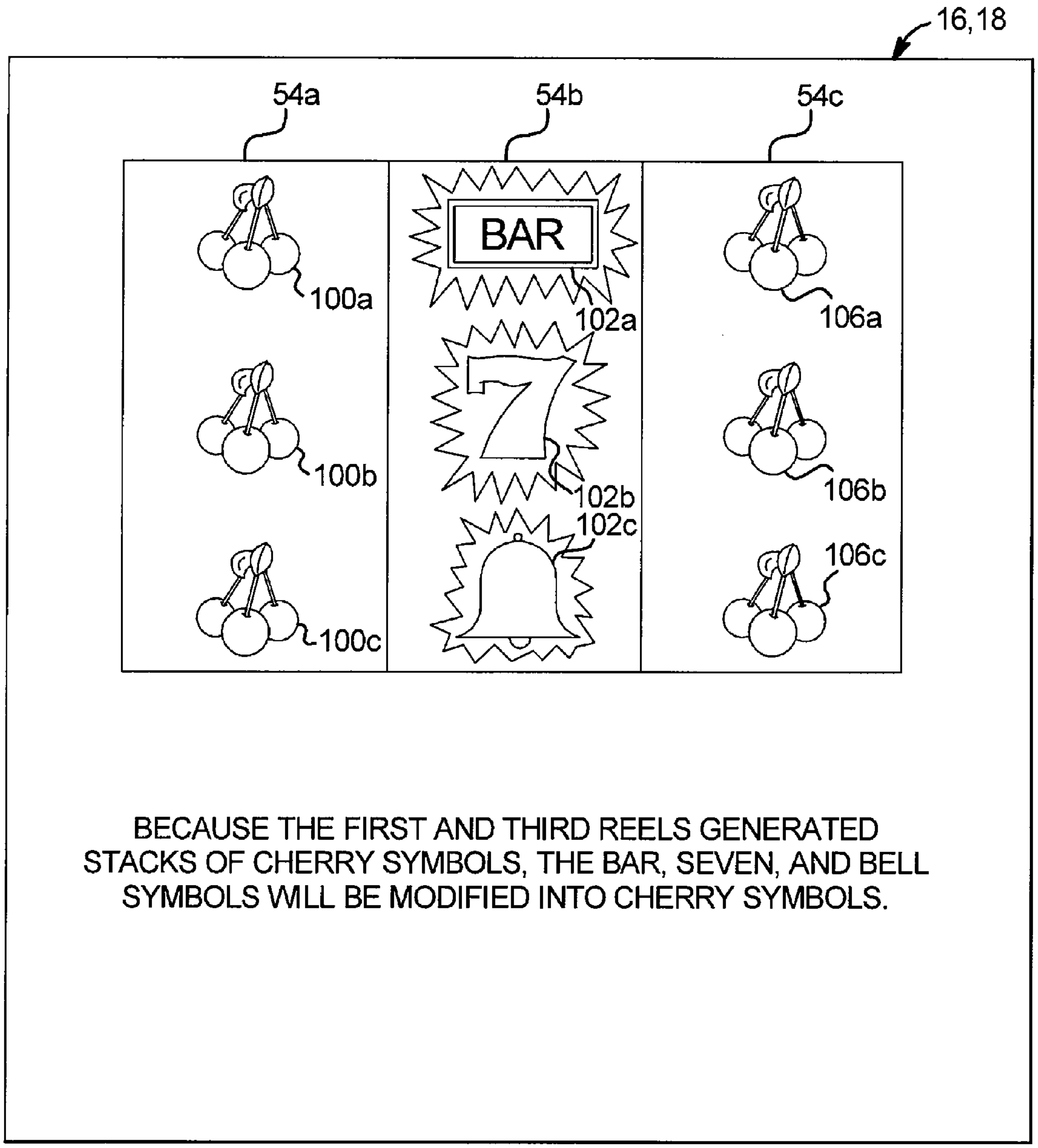
FIGS. 4A and 4B are elevation views of one embodiment of a display device of the gaming device disclosed herein illustrating two non-adjacent reels that each generated a stack of identical symbols separated by a reel that did not generate a stack of the identical symbols.

In one embodiment, if the gaming device determines that at least two non-adjacent reels each generated a stack of a designated symbol, the gaming device determines if at least one reel positioned between the at least two non-adjacent reels (i.e., the convertible reel) generated at least one symbol different from the designated symbol which formed each stack of symbols. In this embodiment, if the at least two non-adjacent reels each generated a stack of the designated symbol and the convertible reel generated at least one symbol different from the designated symbol which formed each stack of symbols, the gaming device modifies at least one symbol different from the designated symbol displayed on the convertible reel into the designated symbol. The gaming device determines any awards for any winning symbol combinations and provides any determined awards to a player In one example embodiment as seen in FIG. 4A, reel 54*a* generated a stack of three cherry symbols 100*a*, 100*b*, and 100*c*; reel 54*b* generated a bar symbol 102*a*, a seven symbol 102*b*, and a bell symbol 102*c*; and reel 54*c* generated a stack of three cherry symbols 106*a*, 106*b*, and 106*c*. In this example, the gaming device analyzes the symbols displayed on the reels and determines that reels 54*a* and 54*c* each generated a stack of three cherry symbols and are non-adjacent reels (i.e., reel 54*b* is positioned between reels 54*a* and 54*c*). Since reels 54*a* and 54*c* each generated a stack of identical cherry symbols, but reel 54*b* did not generate any cherry symbols, reel 54*b* is classified as a convertible reel. As illustrated in FIG. 4A, an appropriate message such as "BECAUSE THE FIRST AND THIRD REELS GENERATED STACKS OF CHERRY SYMBOLS, THE BAR, SEVEN, AND BELL SYMBOLS WILL BE MODIFIED INTO CHERRY SYMBOLS." may be provided to the player visually, or through suitable audio or audiovisual displays.

Figure 4B:
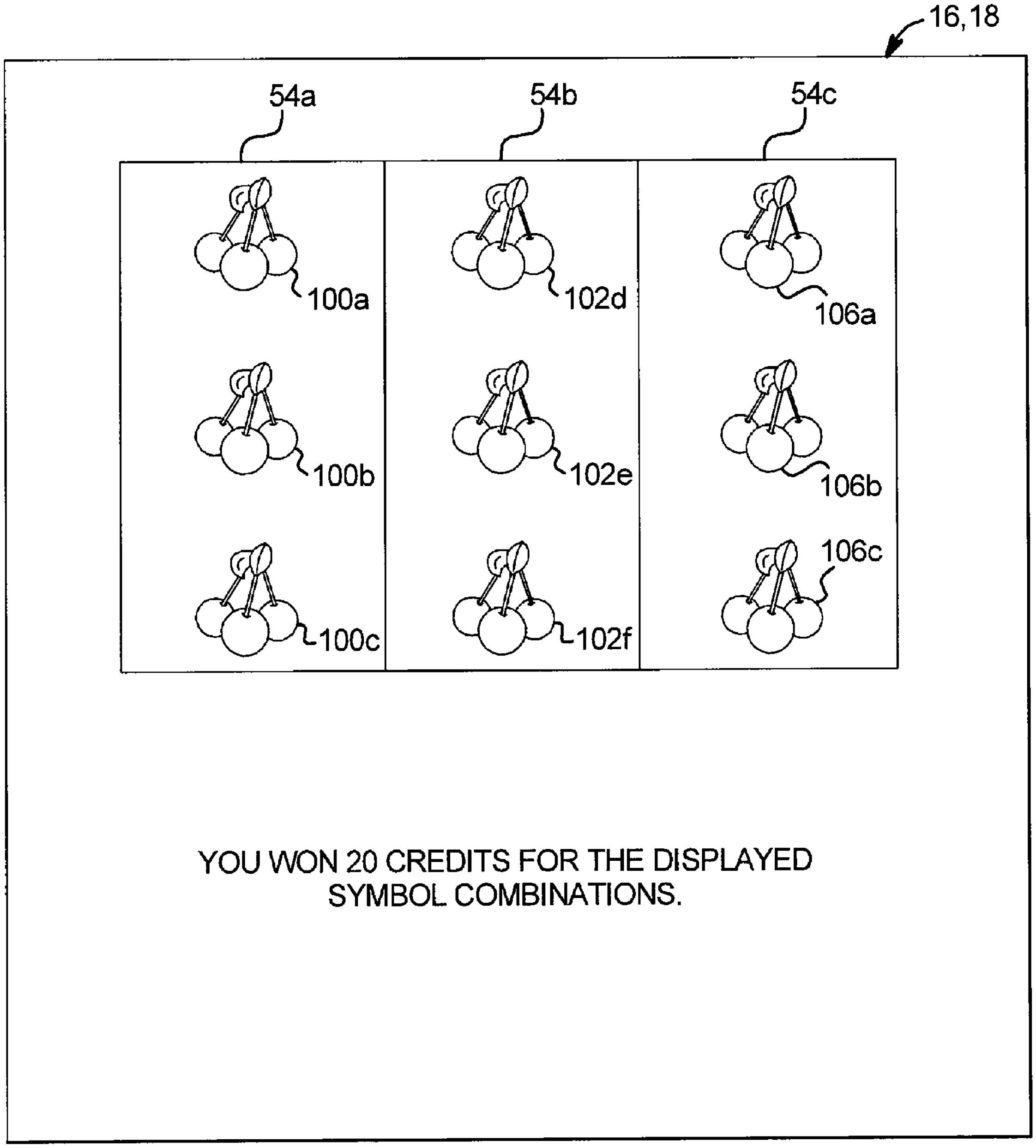

In this example, as illustrated in FIG. 4B, the gaming device converted or modified highlighted bar symbol 102*a*, highlighted seven symbol 102*b*, and highlighted bell symbol 102*c* on convertible reel 54*b* into cherry symbols 102*d*, 102*e*, and 102*f*. Thus, reels 54*a*, 54*b*, and 54*c* each displayed three cherry symbols. After the highlighted symbols on convertible reel 54*b* are modified into cherry symbols, the gaming device determines if any awards are associated with winning symbol combinations. As illustrated in FIG. 4B, an appropriate message such as "YOU WON 20 CREDITS FOR THE DISPLAYED SYMBOL COMBINATIONS" may be provided to the player visually, or through suitable audio or audiovisual displays.

In one embodiment, the awards associated with winning symbol combinations are determined based on wagered on paylines. In an alternative embodiment, the awards associated with winning symbol combinations are determined based on any three identical symbols generated on any three adjacent reels in the same row. In another embodiment, the awards associated with winning symbol combinations are determined based on ways to win as described above. In another embodiment, the awards associated with winning symbol combinations are determined based on scatter pays. In another embodiment, awards associated with winning symbol combinations are determined based on analyzing the generated symbols on the reels from either the left most reel to the right most reel or the right most reel to the left most reel. In another embodiment, the awards associated with winning symbol combinations are determined based on any suitable determination. It should therefore be appreciated that this embodiment provides that a plurality of winning symbol combinations are formed even if two non-adjacent reels each generated a stack of identical symbols and are separated by at least one reel that generated symbols different from the symbols that form the stacks of identical symbols. The gaming device therefore provides an opportunity to form a large number of winning symbol combinations as illustrated in FIG. 4B, even though adjacent reels did not initially generate stacks of identical symbols.

In one alternative embodiment including at least one convertible reel, the gaming device does not modify each of the symbols generated on the convertible reel. In one embodiment, at least two non-adjacent reels generated part of a stack of symbols or a stack of symbols that is smaller than the number of symbols each of the at least two reels generated (i.e., the reels generated a stack of symbols simultaneously with at least one non-stacked symbol). Thus, in one embodiment, if at least two non-adjacent reels each generated a stack of identical symbols, one symbol from each stack of identical symbols generated on the at least two non-adjacent reels may not be displayed in a row with another symbol that forms the stack of identical symbols on one of the non-adjacent reels. In one such embodiment, if the generated symbols created a condition for at least one convertible reel as described above, the gaming device modifies the symbols on the at least one convertible reel that are displayed in the same row as the symbols which form the stacks of symbols on the flanking non-adjacent reels.

Figure 5A:
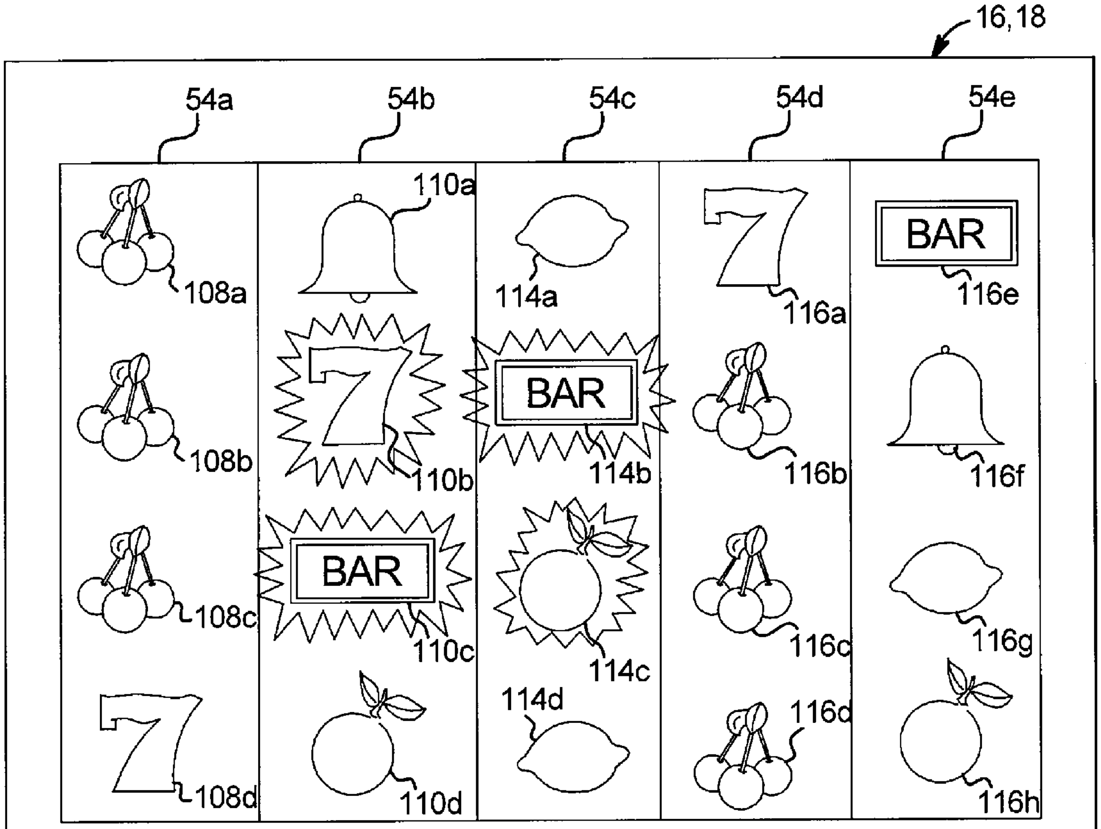
FIGS. 5A and 5B are elevation views of one embodiment of a display device of the gaming device disclosed herein illustrating two non-adjacent reels that each generated a stack of identical symbols separated by two reels that did not generate a stack of the identical symbols, wherein the quantity of symbols that form the stacks of symbols is less than the quantity of the generated and displayed symbols.

In this example embodiment illustrated in FIG. 5A, reel 54*a* generated a stack of three cherry symbols 108*a*, 108*b*, 108*c*, and a seven symbol 108*d*; reel 54*b* generated a bell symbol 110*a*, a seven symbol 110*b*, a bar symbol 110*c*, and an orange symbol 110*d*; reel 54*c* generated a lemon symbol 114*a*, a bar symbol 114*b*, an orange symbol 114*c*, and a lemon symbol 114*d*; reel 54*d* generated a seven symbol 116*a* and a stack of three cherry symbols 116*b*, 116*c*, and 116*d*; and reel 54*e* generated a bar symbol 116*e*, a bell symbol 116*f*, a lemon symbol 116*g*, and an orange symbol 116*h*. The gaming device analyzes the symbols displayed on the reels and determines that reels 54*a* and 54*d* each generated a stack of three cherry symbols and are non-adjacent reels (i.e., reels 54*b* and 54*c* are positioned between reels 54*a* and 54*d*). Since reels 54*a* and 54*d* each generated a stack of identical cherry symbols, but reels 54*b* and 54*c* did not generate any cherry symbols, reels 54*b* and 54*c* are classified as convertible reels. As illustrated in FIG. 5A, an appropriate message such as "BECAUSE THE FIRST AND FOURTH REELS DISPLAYED STACKS OF CHERRY SYMBOLS AND THE HIGHLIGHTED SYMBOLS ARE DISPLAYED IN THE SAME ROW AS THE STACKED CHERRY SYMBOLS, THE HIGHLIGHTED SYMBOLS WILL BE MODIFIED INTO CHERRY SYMBOLS." may be provided to the player visually, or through suitable audio or audiovisual displays.

Figure 5B:
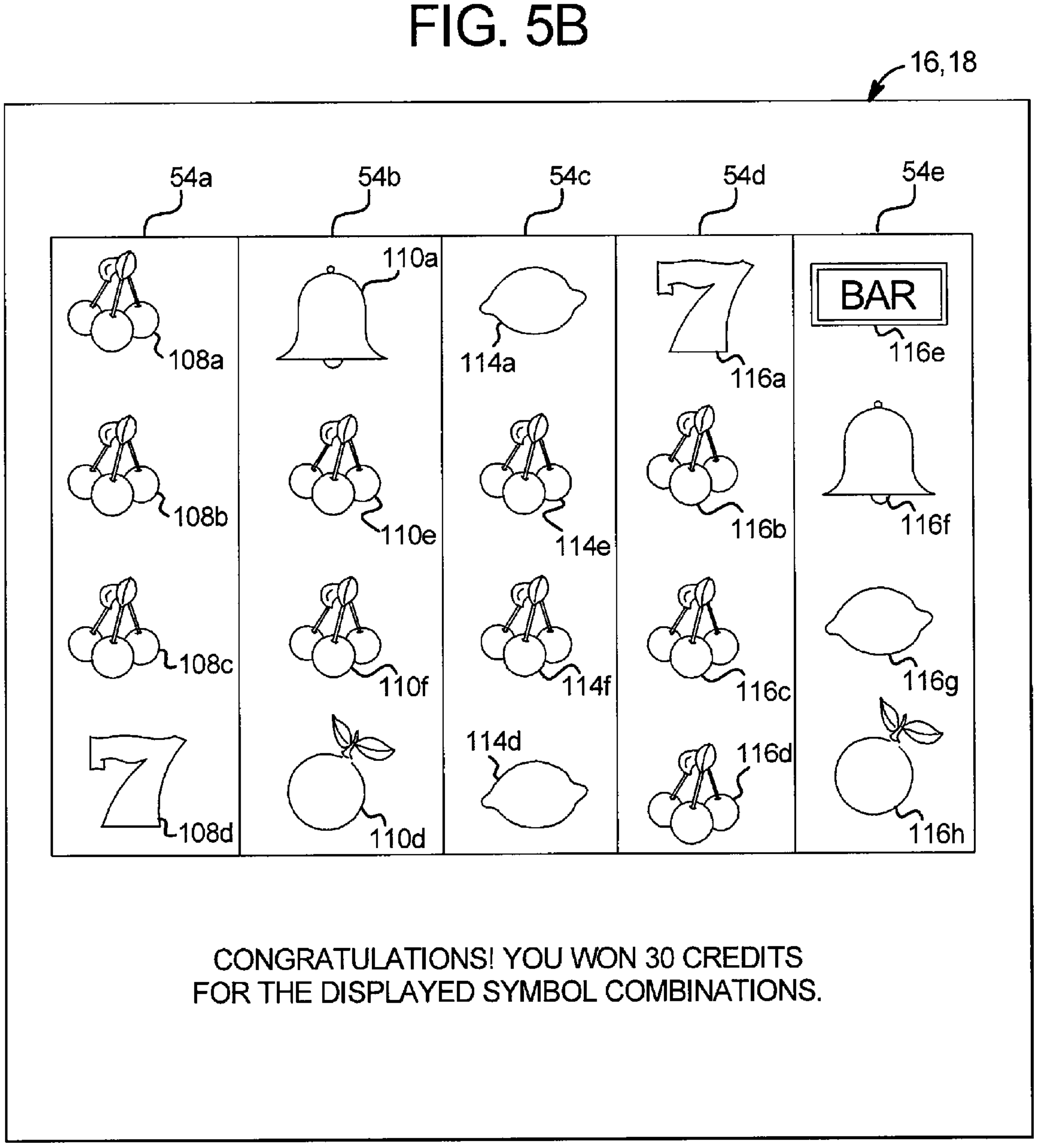

In this example, as illustrated in FIG. 5B, the gaming device modified highlighted seven symbol 110*b*, highlighted bar symbol 110*c*, highlighted bar symbol 114*b*, and highlighted orange symbol 114*c* on convertible reels 54*b* and 54*c* into cherry symbols 110*e*, 110*f*, 114*e* and 114*f* because each highlighted symbol was displayed in the same row as cherry symbols which form the stacks of cherry symbols on reels 54*a* and 54*d*. Thus, reels 54*a*, 54*b*, 54*c*, and 54*d* each displayed a plurality of cherry symbols. After the highlighted symbols on convertible reels 54*b* and 54*c* are modified into cherry symbols, the gaming device determines if any awards are associated with winning symbol combinations. As illustrated in FIG. 5B, an appropriate message such as "CONGRATULATIONS! YOU WON 30 CREDITS FOR THE DISPLAYED SYMBOL COMBINATIONS" may be provided to the player visually, or through suitable audio or audiovisual displays.

As discussed above, awards associated with winning symbol combinations are determined based on paylines, any three identical symbols displayed in the same row, ways to win, scatter pays, a left reel to right reel or a right reel to left reel analysis, or any other suitable method of determination. It should therefore be appreciated that this embodiment provides that a plurality of winning symbol combinations are formed even if two non-adjacent reels each generated a stack of identical symbols that are not aligned in all rows of the generated stacks of symbols and the two non-adjacent reels are separated by a plurality of reels that generated symbols different from the symbols that form the stacks of identical symbols. The gaming device therefore provides an opportunity to form a large number of winning symbol combinations as illustrated in FIG. 5B, even though adjacent reels did not initially generate stacks of identical symbols.

In another alternative embodiment including at least one convertible reel, the gaming device modifies at least one symbol generated on the at least one convertible reel when the non-adjacent reels that flank the at least one convertible reel generate and display stacks of symbols that include different quantities of a designated symbol that forms the stacks of symbols. In one embodiment, if at least two non-adjacent reels each generated a stack of symbols formed from different quantities of the designated symbol, at least one of the designated symbols which forms the stacks of symbols is not displayed in the same row as another designated symbol which forms one of the stacks of symbols. In one such embodiment, if the generated symbols create a condition for at least one convertible reel as described above, the gaming device modifies the symbols on the at least one convertible reel that are different from the designated symbol that forms the stacks of symbols and are displayed in the same row as the symbols which form the stacks of symbols on both of the flanking non-adjacent reels.

Figure 6A:
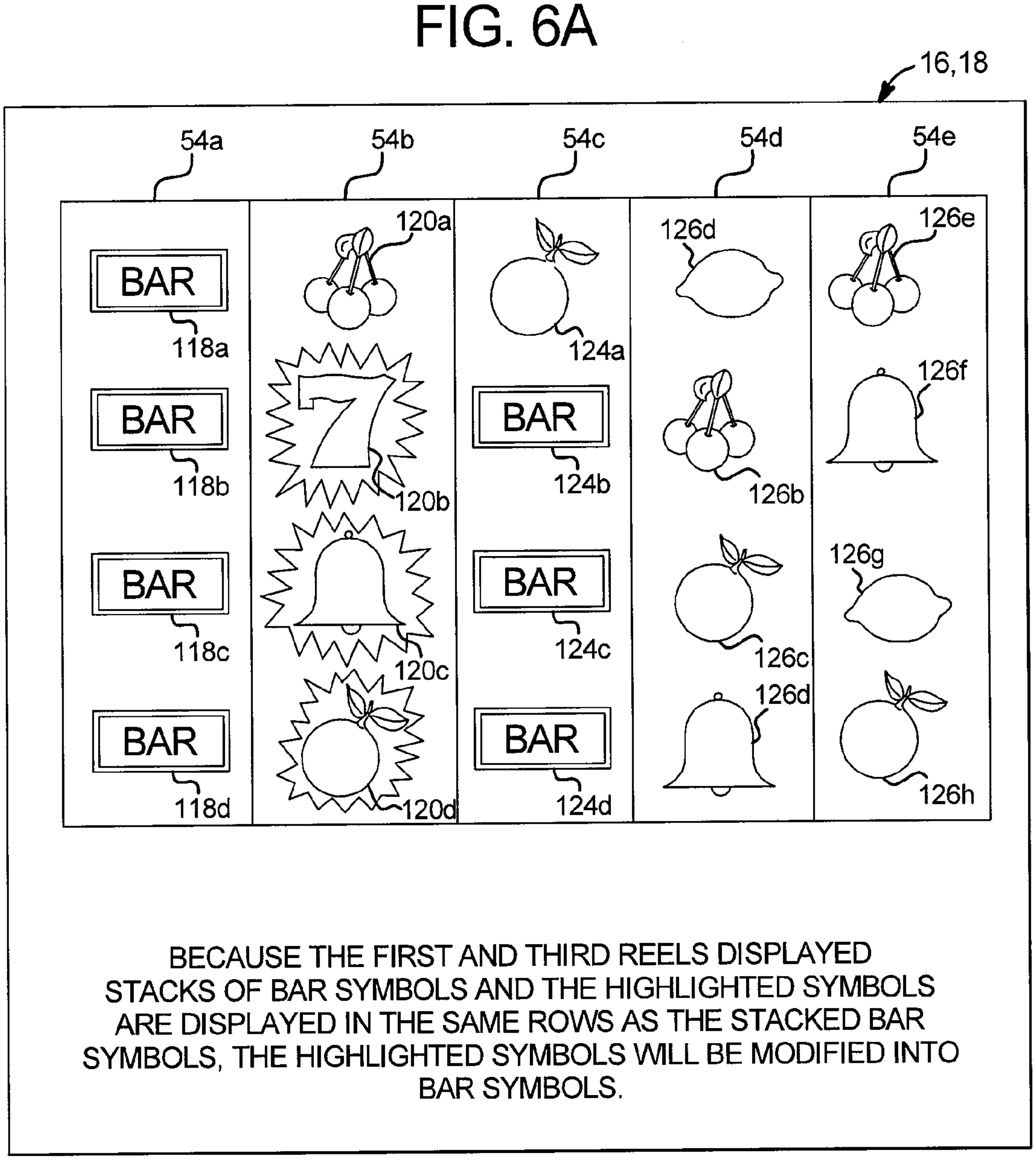
FIGS. 6A and 6B are elevation views of one embodiment of a display device of the gaming device disclosed herein illustrating two non-adjacent reels that each generated a stack of identical symbols separated by one reel that did not generate a stack of the identical symbols, wherein the quantity of symbols in the stacks of identical symbols are different.

In an example embodiment illustrated in FIG. 6A, reel 54*a* generated a stack of four bar symbols 118*a*, 118*b*, 118*c*, and 118*d*; reel 54*b* generated a cherry symbol 120*a*, a seven symbol 120*b*, a bell symbol 120*c*, and an orange symbol 120*d*; reel 54*c* generated an orange symbol 124*a*, and a stack of three bar symbols 124*b*, 124*c*, and 124*d*; reel 54*d* generated a lemon symbol 126*a*, a cherry symbol 126*b*, an orange symbol 126*c*, and a bell symbol 126*d*; and reel 54*e* generated a cherry symbol 126*e*, a bell symbol 126*f*, a lemon symbol 126*g*, and an orange symbol 126*h*. The gaming device analyzes the symbols displayed on the reels and determines that reels 54*a* and 54*c* each generated a stack of bar symbols and are non-adjacent reels (i.e., reel 54*b* is positioned between reels 54*a* and 54*c*). Since reels 54*a* and 54*c* each generated a stack of identical bar symbols, but reel 54*b* did not generate any bar symbols, reel 54*b* is classified as a convertible reel. As illustrated in FIG. 6A, an appropriate message such as "BECAUSE THE FIRST AND THIRD REELS DISPLAYED STACKS OF BAR SYMBOLS AND THE HIGHLIGHTED SYMBOLS ARE DISPLAYED IN THE SAME ROW AS THE STACKED BAR SYMBOLS, THE HIGHLIGHTED SYMBOLS WILL BE MODIFIED INTO BAR SYMBOLS." may be provided to the player visually, or through suitable audio or audiovisual displays.

Figure 6B:
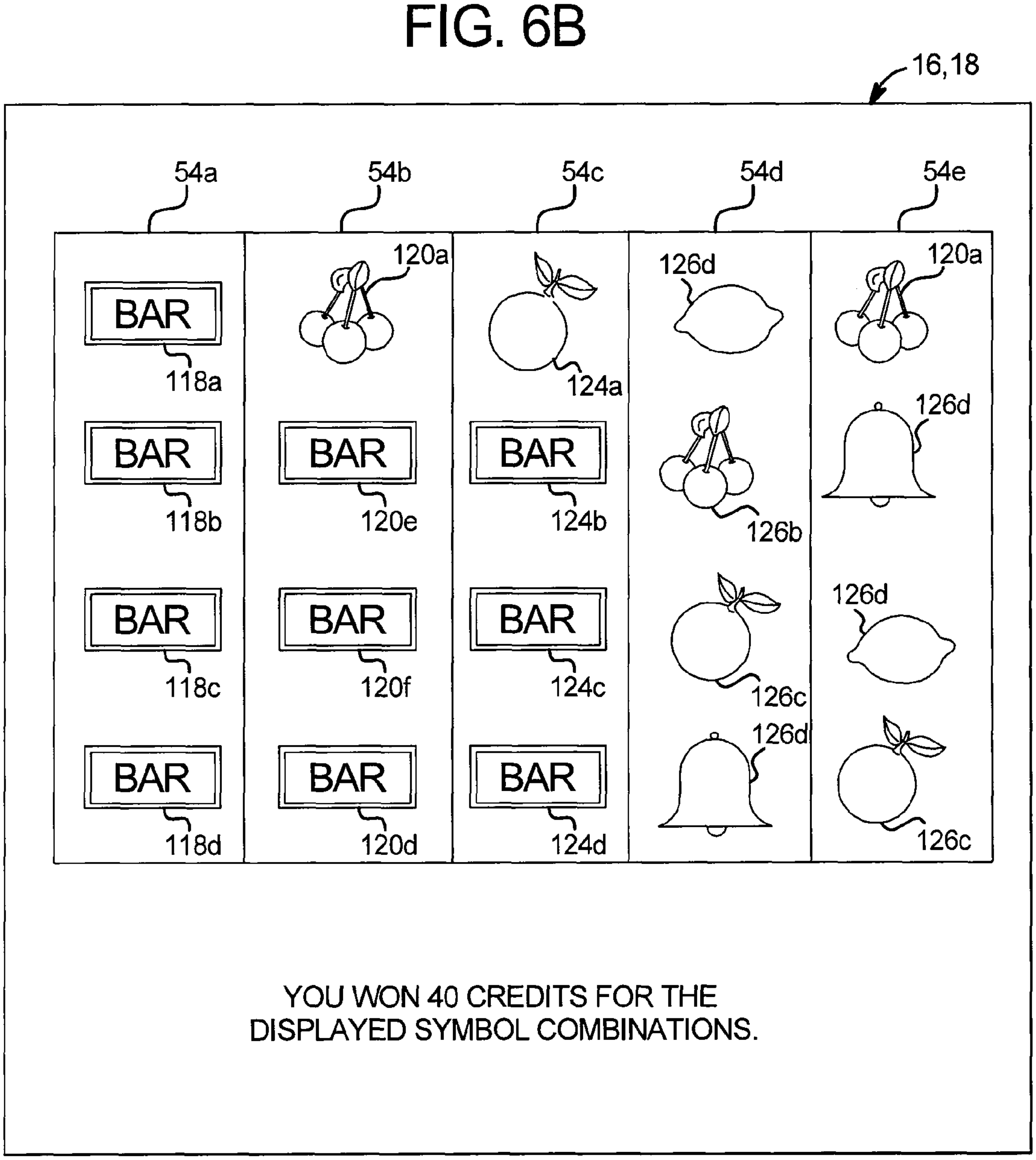

In this example, as illustrated in FIG. 6B, the gaming device modified highlighted seven symbol 120*b*, highlighted bell symbol 120*c*, and highlighted orange symbol 120*d* on convertible reel 54*b* into bar symbols 120*e*, 120*f*, and 120*g* because each highlighted symbol was displayed in the same row as identical stacking bar symbols on reels 54*a* and 54*c*. Thus, reels 54*a*, 54*b*, and 54*c* each displayed a plurality of bar symbols. After the highlighted symbols on convertible reel 54*b* are modified into bar symbols, the gaming device determines if any awards are associated with winning symbol combinations. As illustrated in FIG. 6B, an appropriate message such as "YOU WON 40 CREDITS FOR THE DISPLAYED SYMBOL COMBINATIONS" may be provided to the player visually, or through suitable audio or audiovisual displays.

As discussed above, awards associated with winning symbol combinations are determined based on paylines, any three identical symbols displayed in the same row, ways to win, scatter pays, a left reel to right reel or a right reel to left reel analysis, or any other suitable method of determination. It should therefore be appreciated that this embodiment provides that a plurality of winning symbol combinations are formed even if two non-adjacent reels each generated a stack of identical symbols that are formed from different quantities of the identical symbols and the two non-adjacent reels are separated by at least one reel that generated symbols different from the symbols that form the stacks of identical symbols. The gaming device therefore provides an opportunity to form a large number of winning symbol combinations as illustrated in FIG. 6B, even though adjacent reels did not initially generate stacks of identical symbols.

In one alternative embodiment, the gaming device determines if any awards are associated with winning symbol combinations before modifying any of the symbols displayed on any convertible reel. For example, in a gaming device including five reels, the first reel generated a stack of three cherry symbols; the second reel generated a lemon symbol, a bar symbol, and a seven symbol; the third reel generated an orange symbol, a bar symbol, and a bell symbol; the fourth reel generated a bell symbol, a bar symbol, and a seven symbol; and the fifth reel generated a stack of three cherry symbols. In this embodiment, the gaming device determines that an award is associated with an initial winning combination of bar symbols formed from symbols generated on the second, third, and fourth reels. The gaming device determines if the player wagered on a payline that passes through the three adjacent bar symbols. If the gaming device determines that a player wagered a payline that passes through the bar symbols, the gaming device provides the award to the player. The gaming device subsequently determines that the second, third, and fourth reels are convertible reels because the first and fifth reels both generated a stack of cherry symbols, the first and the fifth reel flank the second, third, and fourth reels, and the second, third, and fourth reels generated symbols different from cherry symbols. Thus, the gaming device modifies a plurality of the symbols on the second, third, and fourth reels into cherry symbols. The gaming device makes another determination of whether any awards are associated winning symbol combinations based on a player's wagered on paylines.

In an alternative embodiment, after the reels generated a plurality of symbols, the gaming device ignores any initial winning symbol combinations. That is, if the gaming device determines that at least one reel of the plurality of reels is a convertible reel, the gaming device will not determine any awards associated with winning symbol combinations based on the initial generation of symbols. Thus, the gaming device will wait to determine if any awards are associated with winning symbol combinations until after at least one symbol on the at least one convertible reel is modified into a symbol that forms the stacks of symbols on the flanking reels.

In one alternative embodiment, at least one reel flanks at least two convertible reels, wherein the flanking reel flanks each of the at least two convertible reels from different directions (i.e., the flanking reel flanks a first reel on the right while the flanking reel also flanks a second reel on the left). For example, in a gaming device including five reels, the first reel generated a stack of three lemon symbols; the second reel generated a cherry symbol, a bar symbol, and a seven symbol; the third reel generated a stack of three lemon symbols; the fourth reel generated a bell symbol, an orange symbol, and a seven symbol; and the fifth reel generated a stack of three lemon symbols. The second and fourth reels are convertible reels because the first, third, and fifth reels each generated a stack of lemon symbols, the first and third reels flanked the second reel, the third and fifth reels flanked the fourth reel, and the second and fourth reels generated symbols different than the lemon symbols. Thus, the gaming device modifies at least one symbol on both the second and fourth reels into lemon symbols. It should therefore be appreciated that in one embodiment including five or more reels, at least one reel that generated a stack of symbols flanks at least one convertible reel on either side of the at least one flanking reel.

In one embodiment, the gaming device determines if modifying symbols on a convertible reel would lead to any winning symbol combinations before modifying any symbols displayed on any convertible reel. For example, in a gaming device including four reels, the first reel generated a stack of three cherry symbols; the second reel generated a lemon symbol, a bar symbol, and a seven symbol; the third reel generated a stack of three cherry symbols; and the fourth reel generated a bell symbol, an orange symbol, and a seven symbol, thus the second reel is a convertible reel because the first and third reels generated a stack of cherry symbols and flanked the second reel. In this example, if the gaming device required four identical symbols displayed on adjacent reels to form a winning symbol combination, modifying the symbols on the second reel would not create any awards associated with any winning symbol combinations because the fourth reel did not generate any cherry symbols. Therefore, in this example, the gaming device would not modify the symbols on the convertible second reel because the gaming device determined that the modification would not lead to any winning symbol combinations.

In one embodiment, the gaming device modifies at least one symbol on a convertible reel positioned between two flanking reels depending on what portion of a stack of symbols is generated and displayed on the flanking reels. In one embodiment the gaming device determines if an entire stack of symbols is displayed before modifying any symbols on a convertible reel positioned between two flanking reels. For example, if at least one flanking reel of a pair of flanking reels generates and displays only part of a stack of symbols, the gaming device does not modify any symbols on at least one convertible reel positioned between the two flanking reels.

In an alternative embodiment, the gaming device determines if at least half of a stack of symbols was generated and displayed on the flanking reels before modifying any symbols on the convertible reel. For example, if at least one flanking reel of a pair of flanking reels generates and displays less than half of a stack of symbols (i.e., two cherry symbols from a stack of five cherry symbols), the gaming device does not modify any symbols on at least one convertible reel positioned between the two flanking reels. On the other hand, if a pair of flanking reels each generates and displays at least half of a stack of symbols (i.e., three cherry symbols from a stack of five cherry symbols), the gaming device modifies at least one symbol on at least one convertible reel positioned between the two flanking reels.

In another alternative embodiment, the gaming device modifies at least one symbol on a convertible reel positioned between two flanking reels if any part of a stack of symbols are displayed on each of the two flanking reels. For example, if one flanking reel of a pair of flanking reels generates and displays part of a stack of symbols (i.e., two cherry symbols from a stack of four cherry symbols) and the other flanking reel generates an entire stack of symbols (i.e., four cherry symbols from a stack of four cherry symbols), the gaming device modifies at least one symbol on a convertible reel positioned between the two flanking reels.

In one embodiment of the game including stacks of symbols and convertible reels, a convertible reel generates one symbol that is identical to the symbol used to form the stacks of symbols on the flanking reels. In one embodiment, if the convertible reel generated a symbol used to form the stacks of symbols on flanking reels, the gaming device will not convert or modify any of the symbols displayed on the convertible reel. However, in an alternative embodiment, if the convertible reel generated a symbol used to form the stacks of symbols on flanking reels, the gaming device converts or modifies any or all of the symbols on the convertible reel that are different from the symbols used to form the stacks of identical symbols on the flanking reels.

In another embodiment of the game including stacks of symbols and convertible reels, where the gaming device determines that a plurality of reels are convertible reels, the gaming device selectively modifies the symbols on at least one of the convertible reels and determines if any awards are associated with winning symbols combinations. For example, if a gaming device determines that two reels are convertible reels, the gaming device selectively modifies at least one symbol on one or both of the convertible reels. In one embodiment, the gaming device selects a first convertible reel and modifies at least one of the symbols on the first convertible reel, while not modifying any symbols on a second convertible reel. After the gaming device modified at least one of the symbols on the first convertible reel, the gaming device determines if any awards are associated with winning symbol combinations based on a player's wagered on paylines. In an alternative embodiment, for each of the reels that the gaming device determines are convertible reels, the gaming device modifies at least one of the symbols on each of the convertible reels and makes additional determinations if any awards are associated with winning symbol combinations.

In another embodiment, a reel including a particular configuration of symbols (i.e., the configuration of stacked and non-stacked symbols) that is utilized with the gaming device is predetermined. In alternative embodiments, a reel including a particular configuration of symbols that is utilized is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming device converts or modifies any symbol that appears on a convertible reel into a symbol that forms the stack of symbols on flanking reels. In another embodiment, the determination to modify symbols on a convertible reel is determined one symbol at a time on the convertible reel (i.e., sequentially). In an alternative embodiment, the symbols that are modified on a convertible reel are predetermined. In other alternative embodiments, the symbols on a convertible reel that are modified are randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, certain reels are non-convertible reels, wherein the symbols on the non-convertible reels cannot be modified. In one such embodiment, symbols displayed on a non-convertible reel are not modified even if the non-convertible reel is positioned between at least two non-adjacent reels that each generated a stack of a designated symbol and the non-convertible reel generated at least one symbol different from the designated symbol which formed each stack of symbols. In one embodiment, the determination to designate a reel as non-convertible is predetermined. In other alternative embodiments, the determination to designate a reel as non-convertible is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, certain stacks of symbols do not function to modify symbols on convertible reels. In one embodiment, including stacks of cherry symbols and stacks of bell symbols, the stacks of cherry symbols modify symbols on a convertible reel while the stacks of bell symbols cannot function to modify symbols on the convertible reel. In one such example including three reels, the first reel generated a stack of two cherry symbols and a stack of two bell symbols; the second reel generated a bar symbol, a lemon symbol, a seven symbol, and an orange symbol; and the third reel generated a stack of two cherry symbols and a stack of two bell symbols. The gaming device analyzes the symbols displayed on the reels and determines that the first and third reels each generated a stack of cherry symbols and a stack of bell symbols. The gaming device also determines that the first and third reels are non-adjacent reels (i.e., the second reel is positioned between the first and third reels). Since the first and third reels each generated a stack of identical cherry symbols, but the second reel did not generate any cherry symbols, the second reel is classified as a convertible reel. In this example, the gaming device modified the bar symbol and the lemon symbol into cherry symbols because the bar and lemon symbols were displayed in the same row as identical stacking cherry symbols on the first and third reels. The gaming device however does not modify the seven and orange symbols because these symbols were displayed in the same rows as the stacking bell symbols on the first and third reels. Thus, it should be appreciated that certain stacks of symbols do not modify symbols on convertible reels.

In one embodiment, the determination to designate a stack of symbols as a non-modifying stack of symbols is predetermined. In other alternative embodiments, the determination to designate a stack of symbols as a non-modifying stack of symbols is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, different symbols are used to form the stacks of symbols. For example, in the above-described embodiments, cherry symbols, bar symbols, and lemon symbols were used to form stacks of symbols. However, any suitable symbol can be used to form a stack of symbols. The reels are configured such that some of the symbols on the reels are designated as stacking symbols, while other symbols are configured as non-stacking symbols. In one such embodiment, the symbols used to form a stack of symbols are derived from a particular theme associated with the gaming device. In another embodiment of a gaming device including virtual reels that includes more than twenty-two symbols, a stack of symbols is formed from each style of symbol used on the virtual reel (i.e., symbols such as cherry, bell, orange, seven, and star symbols).

In one embodiment, the game including stacks of symbols and convertible reels is a primary game. For example, a gaming device is configured to enable a player to immediately begin playing the game including stacks of symbols and convertible reels upon a wager on the game. In one embodiment, the player must make a minimum wager before the gaming device enables the game including stacks of symbols and convertible reels. That is, the reels in the primary game are not configured with stacks of symbols until the player's wager meets a predetermined threshold. Alternatively, in one embodiment, stacks of symbols are included in the initial game, but the gaming device does not modify symbols on convertible reels until the player's wager meets a predetermined threshold. In an alternative embodiment, the game including stacks of symbols and convertible reels is a secondary or bonus game. In one such embodiment, if a predetermined triggering event occurs in a primary game, the game device is configured to enable a player to play the game including stacks of symbols and convertible reels. In one embodiment, the triggering event in the primary game may not occur until the player made a minimum wager on the primary game.

In one embodiment of the game including stacks of symbols and convertible reels, the modifications of symbols on convertible reels are animated. The animation includes, but is not limited to symbols moving in any direction, simulating actual movement, operation or behavior, bending, transforming into different shapes or sizes, separating into different parts, expanding or contracting, changing colors, shades or patterns, illuminating, making sounds or otherwise having dynamic characteristics.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming system comprising:

at least one input device;

at least one display device operable to display a game;

at least one processor; and at least one memory device which stores a plurality of instructions which, when executed by the at least one processor, cause the at least one processor to operate with the at least one display device and the at least one input device to, for at least one play of the game:

(a) display said game including a plurality of adjacently arranged reels, wherein:

(i) a first of the reels includes a plurality of symbols including a plurality of at least one designated symbol arranged adjacent to each other on the first reel;

(ii) a second of the reels includes a plurality of symbols; and (iii) a third of the reels includes a plurality of symbols including a plurality of the at least one designated symbol arranged adjacent to each other on the third reel;

(b) generate and display a plurality of symbols on the plurality of reels;

(c) determine if the first and third reel each display at least two symbols of the plurality of the at least one designated symbol;

(d) when the first and third reels each display at least two symbols of the plurality of the at least one designated symbol, modify at least one of any symbol that is different from the designated symbol displayed on the second reel into the designated symbol;

(e) determine an award for any winning symbol combinations; and (f) display any determined award.

2. The gaming system of claim 1, wherein a fourth of the reels includes a plurality of symbols and a fifth of the reels includes a plurality of symbols.

3. The gaming system of claim 2, wherein the fourth reel includes a plurality of the at least one designated symbol displayed adjacent to each other on the fourth reel, and the fifth reel includes a plurality of the at least one designated symbol displayed adjacent to each other on the fifth reel.

4. A method of operating a gaming device, said method comprising:

(a) causing at least one processor to execute a plurality of instructions stored in at least one memory device to operate with at least one display device to display a game including a plurality of adjacently arranged reels, wherein:

(i) a first of the reels includes a plurality of symbols including a plurality of at least one designated symbol arranged adjacent to each other on the first reel;

(ii) a second of the reels includes a plurality of symbols; and (iii) a third of the reels includes a plurality of symbols including a plurality of the at least one designated symbol arranged adjacent to each other on the third reel;

(b) causing the at least one processor to execute the plurality of instructions to operate with the at least one display device to generate and display a plurality of symbols on the plurality of reels;

(c) causing the at least one processor to execute the plurality of instructions to determine if the first and third reel each display at least two symbols of the plurality of the at least one designated symbol;

(d) when the first and third reels each display at least two symbols of the plurality of the at least one designated symbol, causing the at least one processor to execute the plurality of instructions to modify at least one of any symbol that is different from the designated symbol displayed on the second reel into the designated symbol;

(e) causing the at least one processor to execute the plurality of instructions to determine an award for any winning symbol combinations; and (f) causing the at least one processor to execute the plurality of instructions to operate with the at least one display device to display any determined award.

5. The method of claim 4, which is provided through a data network.

6. The method of claim 5, wherein the data network is an internet.

* * * * *